(12) United States Patent
Vance

(10) Patent No.: US 10,377,400 B2
(45) Date of Patent: Aug. 13, 2019

(54) SYSTEMS AND METHODS FOR BRAKING OR LAUNCHING A RIDE VEHICLE

(71) Applicant: Universal City Studios LLC, Universal City, CA (US)

(72) Inventor: Eric Vance, Ocoee, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 263 days.

(21) Appl. No.: 15/458,767

(22) Filed: Mar. 14, 2017

(65) Prior Publication Data

US 2017/0183022 A1   Jun. 29, 2017

Related U.S. Application Data

(62) Division of application No. 14/452,175, filed on Aug. 5, 2014, now Pat. No. 9,610,509.

(51) Int. Cl.
*B60L 13/03* (2006.01)
*B61L 27/00* (2006.01)
(Continued)

(52) U.S. Cl.
CPC .......... *B61L 27/0038* (2013.01); *A63G 21/04* (2013.01); *B60L 13/03* (2013.01);
(Continued)

(58) Field of Classification Search
CPC ...... B60L 13/06; B60L 2200/26; B60L 13/04; B60L 13/10; B60L 13/08; B60L 13/03;
(Continued)

(56) References Cited

U.S. PATENT DOCUMENTS 3,792,665 A * 2/1974 Nelson ................. B60L 15/005
104/292
3,937,148 A   2/1976 Simpson
(Continued)

FOREIGN PATENT DOCUMENTS

DE   2407522   8/1975
DE   2418481   10/1975
(Continued)

OTHER PUBLICATIONS

Hyprostatik: "PM Flow Controller for Guides", Sep. 10, 2007, pp. 1-2.
(Continued)

*Primary Examiner* — Mark T Le
(74) *Attorney, Agent, or Firm* — Fletcher Yoder, P.C.

(57) ABSTRACT

In one embodiment, a system includes a linear induction motor (LIM) installed in a curved portion of a track, a ride vehicle disposed upon the track, one or more reaction plates coupled to a side of the ride vehicle facing the track via a plurality of actuators, one or more sensors configured to monitor an air gap between the one or more reaction plates and the LIM, and a processor configured to determine which of the plurality of actuators to actuate and a desired performance of each of the plurality of actuators based on data received from the one or more sensors to maintain the air gap at a desired level throughout traversal of the curve by the ride vehicle.

19 Claims, 5 Drawing Sheets

(51) Int. Cl.
*A63G 21/04* (2006.01)
*B60L 15/00* (2006.01)
*H02K 41/025* (2006.01)
*H02K 11/215* (2016.01)
*H02P 25/062* (2016.01)
*B61L 23/14* (2006.01)
*H02K 1/24* (2006.01)

(52) U.S. Cl.
CPC ............ *B60L 15/005* (2013.01); *B61L 23/14* (2013.01); *H02K 11/215* (2016.01); *H02K 41/025* (2013.01); *H02P 25/062* (2016.02); *B61L 2201/00* (2013.01); *H02K 1/246* (2013.01); *H02K 2201/03* (2013.01); *H02K 2213/09* (2013.01); *Y02T 10/644* (2013.01); *Y02T 10/645* (2013.01)

(58) Field of Classification Search
CPC ........ B60L 15/005; B60L 13/035; B60L 3/00; B60L 5/005; B61B 13/08; A63G 21/04; H02K 41/025; H02K 2201/03; H02K 2213/09; B61L 2201/00; B61L 23/14; B61L 27/0038
USPC .................................... 104/284, 292; 191/10
See application file for complete search history.

(56) References Cited

U.S. PATENT DOCUMENTS

| | | | |
|---|---|---|---|
| 4,055,123 | A | 10/1977 | Heidelberg |
| 4,641,586 | A | 2/1987 | Miller et al. |
| 4,836,344 | A | 6/1989 | Bolger |
| 4,953,470 | A | 9/1990 | Yamaguchi |
| 5,904,101 | A | 5/1999 | Kuznetsov |
| 6,499,701 | B1* | 12/2002 | Thornton ................ B60L 5/005 246/1 C |
| 7,303,054 | B2 | 12/2007 | Rosner |
| 7,950,333 | B2 | 5/2011 | Crawford et al. |
| 8,132,513 | B2 | 3/2012 | Crawford et al. |
| 8,162,770 | B2 | 4/2012 | Hunter et al. |
| 2008/0202374 | A1* | 8/2008 | Muller .................... A63G 7/00 104/53 |
| 2010/0117461 | A1* | 5/2010 | Eastham .............. H02K 41/025 310/13 |

FOREIGN PATENT DOCUMENTS

| | | |
|---|---|---|
| DE | 2425027 | 12/1975 |
| DE | 2511382 | 9/1976 |
| DE | 102004051577 | 5/2006 |
| JP | 4121048 | 4/1992 |
| JP | H05718 | 8/1993 |
| JP | H07231515 | 8/1995 |
| RU | 2293667 | 2/2007 |
| WO | 2007108586 | 9/2007 |
| WO | 2009092122 | 7/2009 |

OTHER PUBLICATIONS

Li Meng et al. "Characteristics of Linear Induction Motor Considering Material of Reaction Plate Change", Journal of Computers, vol. 8, No. 1, Jan. 1, 2013, pp. 102-107.
PCT International Search Report and Written Opinion dated Oct. 19, 2015.
Yoshida, Kinjiro et al., "Pitching Stability Analysis and Control for Underwater Maglev Linear Motor Vehicle ME02", 12th International Power Electronics and Motion Control Conference, IEEE, Aug. 1, 2006, pp. 1814-1819.
EP 15747661.5 Communication pursuant to Article 94(3) EPC dated Apr. 12, 2018.
RU 2017107065 Office Action dated Feb. 22, 2019.

* cited by examiner

SYSTEMS AND METHODS FOR BRAKING OR LAUNCHING A RIDE VEHICLE

CROSS REFERENCE TO RELATED APPLICATIONS

This application is a divisional application of U.S. patent application Ser. No. 14/452,175, filed Aug. 5, 2014, the entire disclosure of which is incorporated herein by reference in its entirety.

BACKGROUND

The present disclosure relates generally to a motion control mechanism and, more particularly, to systems and methods for braking or launching a ride vehicle.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

There are various applications that utilize mechanisms to accelerate and stop a vehicle carrying passengers. For example, trains, roller coasters, and the like, may utilize one or more linear induction motors (LIMs) or linear synchronous motors (LSMs) to accelerate a ride vehicle or car along a track and bring the ride vehicle or car to rest at a desired location. LIMs and LSMs are essentially electric motors that have been unrolled with the rotors lying flat in a linear configuration. LIMs and LSMs produce the force to move a ride vehicle or car by producing a linear magnetic field to attract or repel conductors or magnets in the field. LIMs and LSMs typically include a rotor secured to the track and a stator secured to the moving ride vehicle or car, or vice versa. In LIMs, the rotor may include linear coil windings included in a ferrite core to which three-phase electric alternating current (AC) power may be supplied. The rotor may be covered by a panel. The stator may include a conductor, such as an aluminum steel panel, also referred to as a reaction plate. On the other hand, in LSMs, the rotor may be one or more permanent magnets and the stator may be the coil, both of which may be covered by separate panels. In either scenario, when AC power is supplied to the coil, a magnetic field may be produced. In LIMs, the reaction plate may generate its own magnetic field when placed in the rotor's magnetic field due to induced eddy currents, and the two magnetic fields may repel or attract, thus causing the vehicle to accelerate or slow down. Likewise, in LSMs, when the energized coil stator passes by the permanent magnets in the rotor, electrically controlled magnetic fields may repel or attract, thereby causing the vehicle to accelerate or slow down.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a system includes a linear induction motor (LIM) installed in a curved portion of a track, a ride vehicle disposed upon the track, one or more reaction plates coupled to a side of the ride vehicle facing the track via a plurality of actuators, one or more sensors configured to monitor an air gap between the one or more reaction plates and the LIM, and a processor configured to determine which of the plurality of actuators to actuate and a desired performance of each of the plurality of actuators based on data received from the one or more sensors to maintain the air gap at a desired level throughout traversal of the curve by the ride vehicle.

In accordance with another aspect of the present disclosure, a method includes obtaining data related to an amusement ride vehicle disposed on a track and a compound curve portion of the track via one or more sensors, determining at least one selected reaction plate, via a processor, of a plurality of reaction plates to actuate based on the data using a closed-loop system to maintain a sufficient air gap between the plurality of reaction plates and a linear induction motor (LIM) installed in the track, and actuating actuators coupling the at least one selected reaction plate to a bottom of the ride vehicle as determined throughout the compound curve to bend the reaction plates to maintain the sufficient air gap.

In accordance with another aspect of the present disclosure, a system includes a linear synchronous motor (LSM) including a rotor comprising alternating pole permanent magnets installed on vertebrae panels articulated by a flexible substrate. The rotor is installed on two sides of a compound curve portion of a roller coaster track, and a stator may include linear coil windings secured to the bottom of a ride vehicle disposed on the track. The ride vehicle includes a power source and a processor configured to determine how much power to supply to the linear coil windings and when to supply the power to maintain sufficient air gaps between the stator and the rotor vertebrae panels and to cause the power source to supply the power as determined throughout the compound curve.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
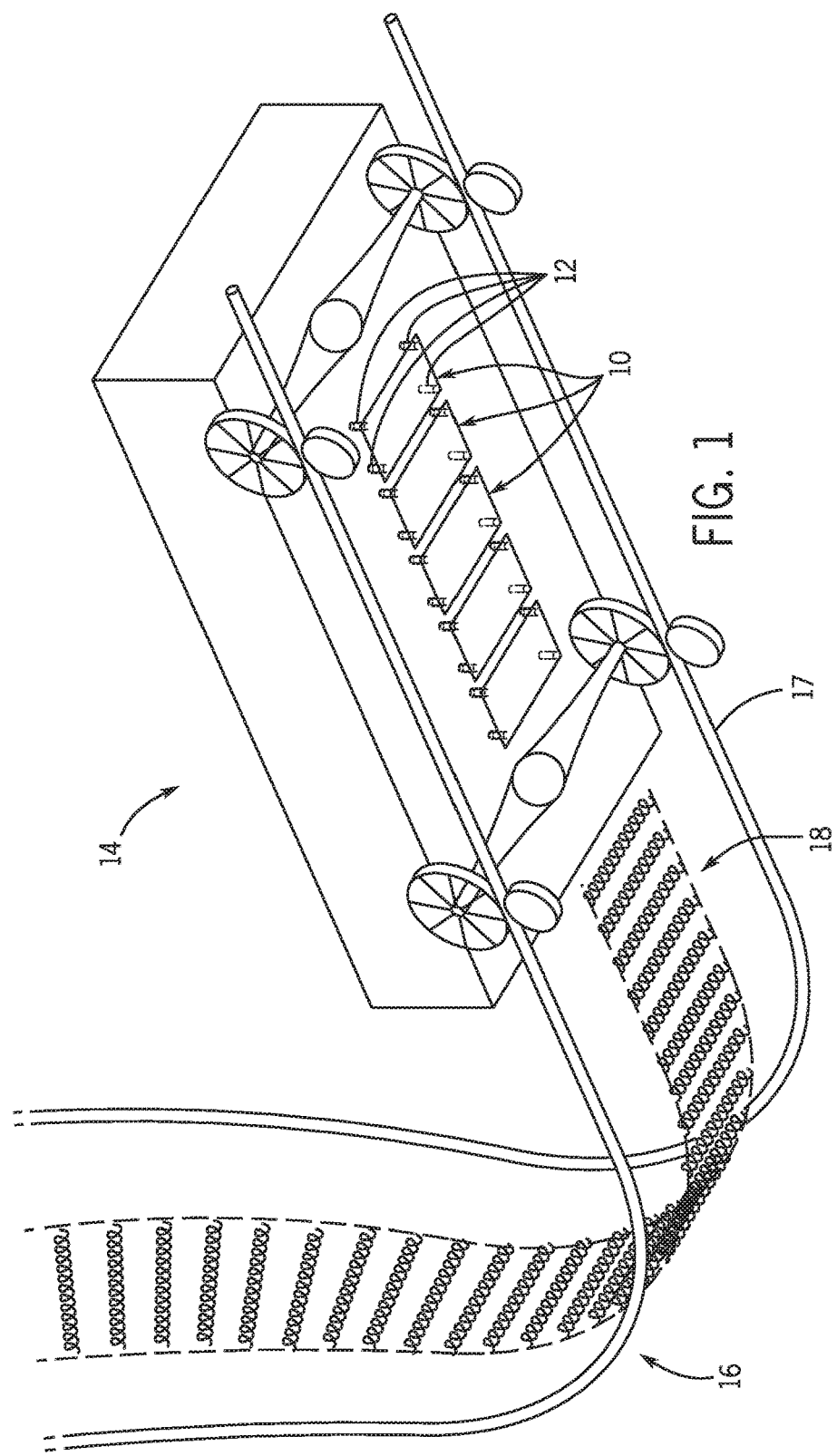
FIG. 1 illustrates a schematic perspective view of a linear induction motor (LIM) including reaction plates with actuators attached to a ride vehicle that is utilized in a compound curve portion of a roller coaster, in accordance with an embodiment.

Mechanisms that are used for launching and braking ride vehicles or cars are often utilized in ground transportation systems, such as trains, and in amusement park rides, such as roller coasters. The mechanisms may include linear induction motors (LIMs) and/or linear synchronous motors (LSMs). LIMs and LSMs may include two elements, a stator and a rotor, that are spaced apart by an air gap. It is desirable to keep the air gap tight (e.g., within a certain threshold distance) to generate a thrust vector and to increase the efficiency of the mechanisms. Generally, applications that utilize LIMs or LSMs arrange the rotors in straight lines or shallow curves on the track. This is often due to a key component in creating an efficient LIM or LSM, which is maintaining the air gap between the stator and the rotor. It is now recognized that, as the curves of the track become more compound, maintaining the air gap becomes more difficult.

As noted above, the LIMs and LSMs utilized in these applications generally install the rotor in a straight or shallow curve portion of a track. As such, in LIMs, the stator may include panels (e.g., aluminum panels), referred to as reaction plates herein, which are generally broken up into flat articulated segmented panels so that they may interact with the opposing element and maintain the air gap during the straight or shallow curve portion of the tracks to launch or stop the ride vehicle or car. The air gap between the stator and the rotor is directly proportional to the efficiency of the LIM or LSM. Thus, if the air gap is not maintained, electric slip may occur that affects the efficiency of the LIM or LSM. In turn, the LIM or LSM may use more energy than is necessary to propel or slow down the vehicle. However, managing the air gap may be difficult for a number of reasons including the inaccuracies of the track, the softness of the wheels, and the strength of the magnetic attraction or repulsion between the stator and the rotor, among others.

These difficulties may be magnified in a compound curve portion of a track, such as a corkscrew, where the stator and rotor are forced to follow a radius that is ascending, descending, or continuous. In addition to the difficulties above, the ride vehicle or car may be pitching and rolling throughout a compound curve, and that may increase the difficulty of maintaining a near constant (e.g., below a threshold) air gap. As a result, these mechanisms are not typically utilized in compound curves. Nevertheless, it is now recognized that there exists a need for improved motion control (e.g., braking or launching) mechanisms, especially ones that may be utilized in compound curve portions of a track.

Thus, the presently disclosed embodiments are directed to systems and methods for a motion control mechanism to manage the air gap between the rotor and the reaction plates. In particular, the disclosed techniques may be of particular advantage because they may overcome the difficulties listed above in managing the air gap in compound curve portions of tracks. Accordingly, present embodiments enable a ride vehicle or car to be further accelerated or slowed during these track portions efficiently instead of relying on momentum alone to traverse the compound curve.

There are numerous embodiments that may achieve these results in accordance with the present disclosure. In one embodiment, actuators may be attached to the four corners of articulated reaction plates secured to the stator on the ride vehicle or car, and the actuators may morph or bend the articulated reaction plates continuously to match the shape of the rotor panels on the track as the ride vehicle or car pitches and rolls through the compound curve helix, thereby maintaining the air gap. In another embodiment, a physical bearing may be placed between the rotor and stator that establishes an air gap and keeps the gap nearly constant as the ride vehicle or car pitches and rolls throughout the compound curve. In another embodiment, hydraulic fluid may be injected between the rotor panels and the stator's reaction plates to provide a hydrodynamic bearing to manage the gap between the two elements. In yet another embodiment, alternating pole permanent magnets may be secured to individual vertebrae of an articulated spine of the rotor and the stator may include the coil windings. A flexible substrate may be located between the vertebrae to allow the spine to bend around the compound curvature of the track to enable the air gap to be maintained.

FIG. 1 illustrates a LIM including reaction plates 10 with actuators 12 attached to a ride vehicle 14 that is utilized in a compound curve 16 portion of a roller coaster track 17. As depicted in the embodiment, the stator of the LIM may include the reaction plates 10 secured to the bottom of the ride vehicle 14, and the rotor of the LIM may include the linear induction coils 18 embedded in the track 17 of the roller coaster. More specifically, the linear coils 18 may be placed in slots of a ferrite core installed throughout one or more portions of the track 17, such as the compound curve 16. The reaction plates 10 may be segmented and articulated aluminum panels or any conductive material. Articulated reaction plates 10 may refer to two or more reaction plates 10 joined by a flexible joint. This may enable the reaction plates 10 to flex and follow the rotor around the helix of the compound curve. Also, the reaction plates 10 may be the same length as the rotor (e.g., linear coil) panels to maintain the magnetic field generated by the linear coil, thereby maintaining the efficiency of the LIM. That is, a reaction plate that is the same size as the linear coil rotor may be capable of producing eddy currents proportional to the magnetic field generated by the linear coil rotor so efficiency may be maintained. Thus, if the linear coils 18 of the rotor are one meter long, the reaction plates 10 may each be one meter long, and so forth.

Since the stator reaction plates 10 are secured to the ride vehicle 14, the reaction plates 10 move continuously with the ride vehicle 14 as it traverses a compound curve 16 in the track 17. Further, as is typical with amusement park rides, one or more ride vehicles 14 may be attached to each other to form a train ride vehicle. Therefore, each ride vehicle 14 of the train ride vehicle may be rolled throughout the compound curve 16 at slightly different angles. As such, the reaction plates 10 on each of the ride vehicles 14 in the train may experience a different pitch and roll because the ride vehicles 14 are traveling through a helix or circle in the compound curve 16. In order to maintain the air gap as close as possible between the rotor and the stator of the LIM of each ride vehicle 14 throughout the ascending, descending, or continuous radius of the compound curve 16, it may be beneficial to curve the stator and/or the rotor to be nearly the same arc. Thus, the actuators 12, which may be secured to each of the four corners of each reaction plate 10 and the ride vehicle 14, may enable modifying the shape of the respective reaction plate 10 to a desired arc at different parts of the compound curve 16, thereby maintaining an air gap with a near constant distance. For example, the average air gap across a one meter LIM (e.g., rotor and stator) may be one centimeter, where the air gap is two millimeters at an apex and seven to eleven millimeters at outside boundaries. Thus, in some embodiments, it is desirable to maintain the air gap at an average distance or within a range based on the length of the stator and rotor of the LIM. Achieving a near constant or consistent air gap throughout the compound curve 16 may enable the LIM to generate a consistent thrust cross vector that utilizes energy efficiently.

Figure 2A:
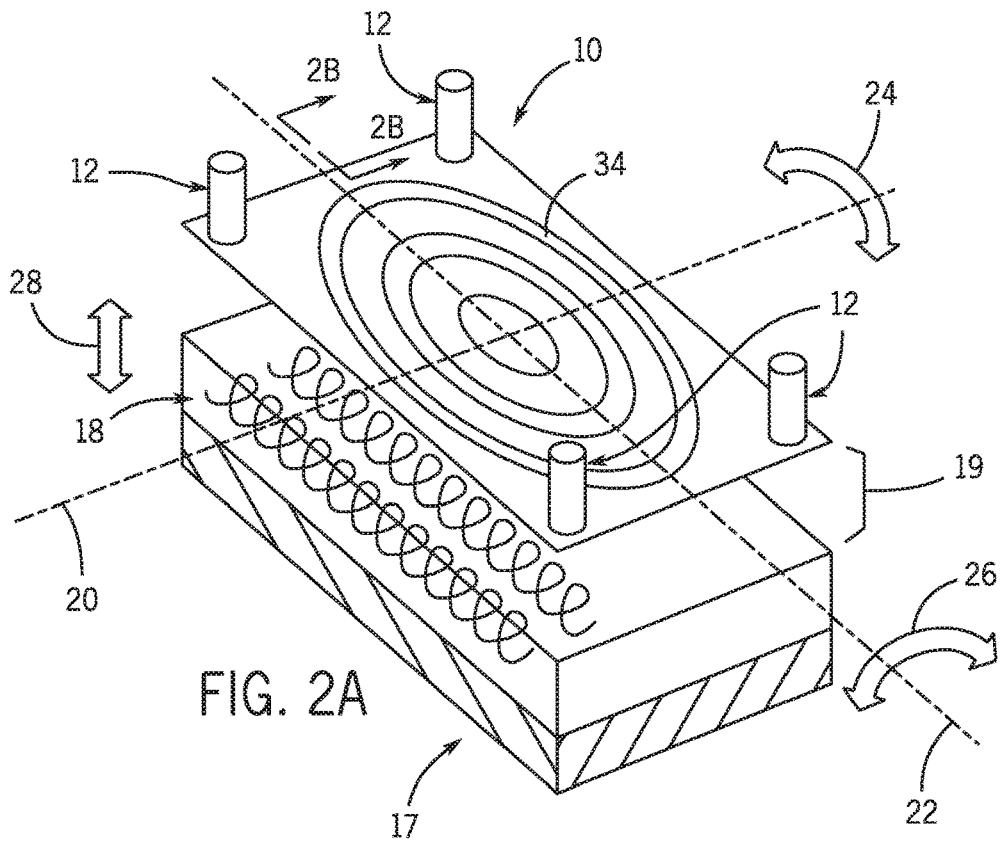
FIG. 2A illustrates the reaction plate including actuators from FIG. 1.

A more detailed illustration of a reaction plate 10 is depicted in FIG. 2A. In the depicted embodiment, the reaction plate 10 includes an actuator 12 secured to each one of the plate's four corners. As shown, the linear coil rotor 18 is grounded in the track 17. The actuators 12 may be hydraulic, electric, pneumatic, or the like. The actuators 12 may function to bend the reaction plate 10 to the proper geometric shape around the helix in order to match the arc of the rotor's linear coil panels so that a near constant air gap 19 may be maintained. In some embodiments, if the actuators 12 are electric, the ride vehicle 14 may include a power source to supply power to the electric actuators 12. The actuators 12 may be configured to operate in conjunction to dynamically bend the reaction plate 10 in numerous directions. As will be discussed below, the actuators 12 may receive commands from one or more processors executing processor-executable code stored on one or more memories to actuate at certain times and in desired ways. Further, one or more sensors, such as proximity sensors, may be utilized to obtain data related to the position of the ride vehicle 14 and the track 17 and send the data to the one or more processors. The processors may utilize the sensor data in a closed loop system to perform mathematical calculations to determine which actuators 12 to actuate and how they should perform to maintain the air gap 19.

To aid the discussion, a set of axes will be referenced. For example, a latitudinal axis 20 may run from the front to the rear of the reaction plate 10, and a longitudinal axis 22 may run from side to side of the reaction plate 10. As the ride vehicle 14 travels through the compound curve 16, the reaction plate 10 may experience heave, pitch, and roll from the helix of the track 17 that may cause distance between the reaction plate 10 and the linear coil rotor 18. Thus, to adjust to the roll, the actuators 12 may be configured to actuate and bend the reaction plate 10 around the latitudinal axis 20, as shown by arrow 24. To adjust to the pitch, the actuators 12 may be configured to actuate and bend the reaction plate 10 around the longitudinal axis 22, as shown by arrow 26. To adjust to the heave, the actuators 12 may be configured to extend or retract in a vertical direction, as shown by arrow 28. In this way, the actuators 12 may bend and/or move the reaction plate 10 to follow the linear coil rotor 18 panels throughout the helix of the compound curve 16 to maintain a near constant air gap 19 as the ride vehicle 14 pitches, rolls, and heaves.

Figure 2B:
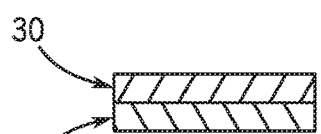
FIG. 2B is a side view of the reaction plate, in accordance with an embodiment.

It should be noted that the reaction plate 10 may be sized appropriately and made of one or more suitable materials so that it may be flexible and allow the actuators 12 to bend it as desired. For example, in an embodiment, the reaction plate 10 may be approximately one eighth of an inch thick, one meter long, and one half of a meter wide. Also, as previously mentioned, the reaction plate 10 may include an aluminum panel, which may increase its flexibility. To further illustrate, FIG. 2B depicts a side view of the reaction plate 10. In the depicted embodiment, the top 30 of the reaction plate 10 may be made of a ferrite material (e.g., iron) and the bottom 32 of the reaction plate 10 may be made of a non-ferrite material (e.g., aluminum). The non-ferrite material may be conductive so that when the material passes through the magnetic field generated by the linear coil, the non-ferrite material may induce eddy currents (shown in FIG. 2A as currents 34), thereby creating its own opposing magnetic field that reacts with the linear coil's magnetic field to accelerate or decelerate the ride vehicle 14. The top 30, which may also be referred to as a backing plate, may inhibit the eddy currents from being lost and, therefore, energy being lost, by utilizing the ferrite material (e.g., iron). Because a backing plate 30 is utilized, this embodiment represents a single sided LIM; however, as discussed in detail below, in some embodiments the backing plate may not be utilized and the LIM may be double sided (e.g., include coils on both sides of the reaction plate).

Figure 3:
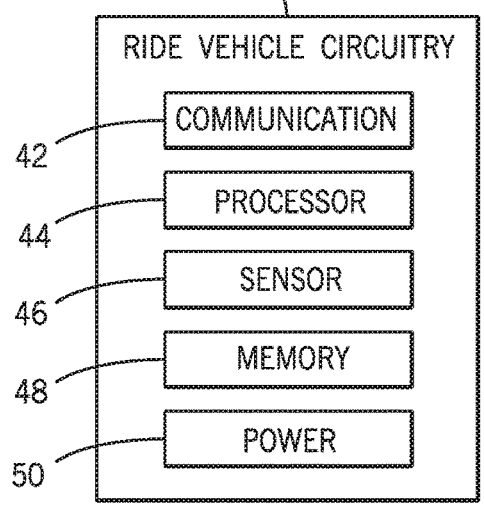
FIG. 3 is a block diagram of ride vehicle circuitry, in accordance with an embodiment.

The ride vehicle 14 may include ride vehicle circuitry 40 to control the actuators as described above. Accordingly, FIG. 3 is a block diagram of ride vehicle circuitry 40. The ride vehicle circuitry 40 may include a communication component 42, a processor 44, a sensor 46, a memory 48, and a power source 50. The communication component 42 may include circuitry for enabling wireless communication with the ride vehicle 14 as it travels around a track 17. As such, the communication component 42 may include a wireless card. The processor 44, which may be one or more processors, may include any suitable processor or microprocessor capable of executing processor-executable code. The sensor 46, which may represent one or more sensors, may include a proximity sensor configured to acquire positional information of the ride vehicle 14 (or portions thereof) in relation to the linear coil rotor panels installed in a track 17 and send the data to the processor 44. In some embodiments, the sensor 46 may include an optic system that tracks information related to the ride vehicle 14 and/or the track 17.

As an example, the processor 44 may run a closed-loop feedback system with the data obtained from the sensor 46 and determine which actuators to actuate and how they should perform based on where the ride vehicle 14 is located on the track 17. The processor 44 may determine that some actuators should extend or retract to dynamically bend the respective reaction plate in the proper geometric shape to maintain a certain air gap distance as the ride vehicle 14 pitches, rolls, and/or heaves through a compound curve. The sensor 46 may continuously obtain and pass data to the processor 44, which may continuously perform calculations and issue instructions to control the actuators as desired. In another embodiment, the communication component 42 may receive command instructions from a control system located externally from the ride vehicle 14, such as in a command center for the ride, and the processor 44 may be configured to execute the received instructions.

The memory 48, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 44 to perform the presently disclosed techniques. The memory 48 may also be used to store the vehicle information obtained by the sensor 46, the command instructions received by the communication component 42, or the like. The power source 50 may include any suitable power source, including, but not limited to, a battery, a solar panel, an electrical generator, or any combination thereof. The power source 50 may supply power to the actuators.

Figure 4:
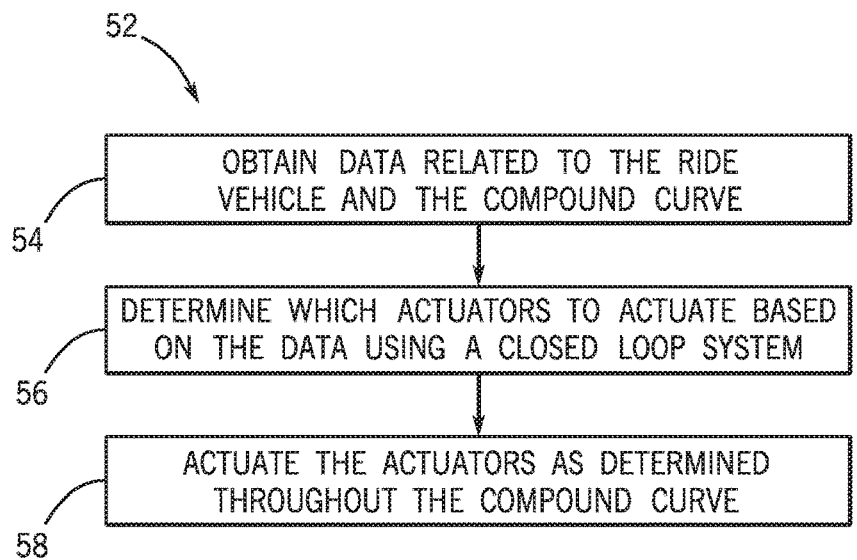
FIG. 4 is a flow diagram of a process suitable for maintaining an air gap in a LIM by utilizing actuators secured to reaction plates, in accordance with an embodiment.

A flow diagram of a process 52 suitable for maintaining an air gap in a LIM throughout a compound curve by utilizing actuators secured to reaction plates and a ride vehicle 14 is shown in FIG. 4. The process 52 may include obtaining data related to the ride vehicle 14 and the compound curve (process block 54), determining which actuators to actuate and the performance of the actuators based on the data using a closed loop system (process block 56), and actuating the actuators as determined throughout traversal of the compound curve (process block 58) by the ride vehicle 14. The process 52 may be implemented as processor-executable code stored on one or more non-transitory, computer-readable mediums (e.g., memory 48). More specifically, regarding process block 54, the sensor 46 included in the ride vehicle circuitry 40 may obtain positional data of the ride vehicle 14 in relation to the track 17. For example, one or more sensors 46 may detect how far the gap is between each reaction plate and the linear coil rotor panel installed in the track 17. Also, the sensors 46 may detect the angle of the linear coil rotor panels' arcs throughout the compound curve. The sensors 46 may send this data to the processor 44.

The processor 44 may utilize the obtained sensor data to determine which actuators to actuate for each reaction plate, the actuation time, and the performance (e.g., extend, retract) of the selected actuators using a closed loop system (process block 56). A control loop system may refer to a control system that automatically changes the output commands based on the difference between the feedback data and the input data. The input data in one embodiment may include data related to the air gap between the reaction plates and the linear coil rotor panels before actuation. As the ride vehicle 14 traverses the compound curve, the sensors 46 may monitor and provide feedback regarding the distance of the air gap between the reaction plate and the linear coil rotor panels after the actuation occurs to the processor 44 so that the processor 44 may make adjustments for subsequent actuators at that portion of the compound curve, if needed. For example, if the air gap is smaller than desired after actuation, the processor 44 may provide commands to the actuators of subsequent reaction plates to not extend as far in order to increase the air gap at that portion of the compound curve. After the actuators have been selected and their respective performance determined, the processor 44 may actuate the actuators accordingly (process block 58) in an ongoing and continuously updated procedure. In this way, the processor 44 may dynamically control how the reaction plates bend and/or move to follow the linear coil rotor panels and maintain a near constant air gap by utilizing the actuators.

Figure 5:
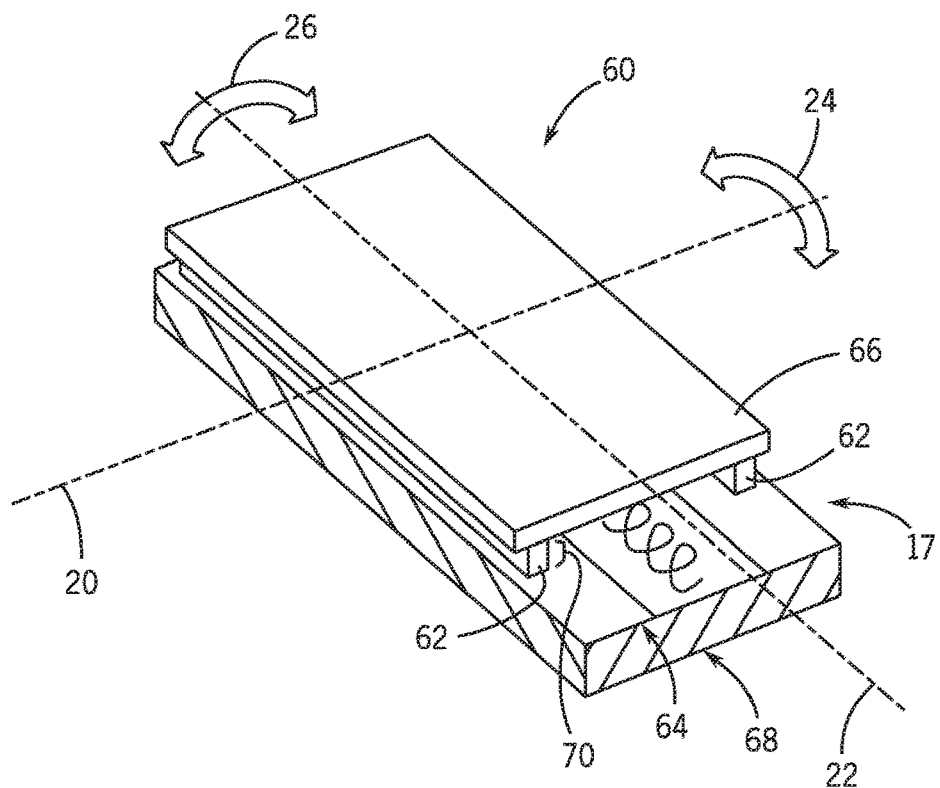
FIG. 5 illustrates running bearings secured to reaction plates of a ride vehicle to maintain an air gap between the reaction plates and an induction motor in a track through a compound curve, in accordance with an embodiment.

Another embodiment of a system 60 to maintain a near constant air gap between a rotor and a stator of a LIM throughout a compound curve of a roller coaster is illustrated in FIG. 5. This embodiment includes utilizing running bearings 62 and a running surface 64. For purposes of discussion, a set of axes will be referenced. The axes include a latitudinal axis 20 that extends from the front to the rear of a reaction plate 66 and a longitudinal axis 22 that extends from side to side of the reaction plate 66. The reaction plate 66 depicted may be secured to the bottom of a ride vehicle 14. Indeed, there may be a plurality of segmented reaction plates 66 secured to the bottom of the ride vehicle 14 and they may be articulated in coordination to form certain overall shapes. Also, the reaction plate 66 may be aluminum and the same length as the linear coil rotor 68 (e.g., induction motor) that is secured to a track 17 so that the reaction plate 66 may efficiently generate eddy currents to oppose the magnetic field generated by the linear coil rotor 68. Further, the reaction plates 66 may be sized appropriately to be flexible in order to bend according to the pitch and roll of the compound curve's helix.

In this embodiment, the linear coil rotor 68 may be substantially covered by the running surface 64. The running surface 64 may be plastic to enable an object in contact with the running surface 64 to slide or roll. Likewise, running bearings 62 are secured to the bottom of the reaction plate 66 on both of its sides. The running bearings 62 may be strips that are several inches wide and several inches thick. The exact thickness of the running bearing 62 may be designed to provide an air gap 70 between the stator (e.g. reaction plate 66) and the linear coil rotor 68 so that the LIM may produce an efficient thrust cross vector. In addition, the running bearings 62 may be in contact with and slide across the running surface 64 throughout the compound curve, thereby maintaining the air gap 70.

However, the compound curve may cause the ride vehicle 14 to pitch and roll, so the running bearings 62 and the running surface 64 may be configured to comply with the pitch and roll of the helix. As such, the running bearings 62 and the running surface 64 may be bent around the latitudinal axis 20, as shown by arrow 24, throughout the compound curve. Additionally, the running bearings 62 and the running surface 64 may be bent around the longitudinal axis 22, as shown by arrow 26, throughout the compound curve. Although the attractive force of the linear coil and the reaction plate 66 may be strong at points throughout the compound curve, the running bearings 62 may inhibit the reaction plates 66 from clasping together with the linear coil rotor 68.

In some embodiments, one or more trailing arms or other spherical joint mechanism may be attached to the segmented reaction plates 66 of the stator and/or the running surface 64 of the linear coil rotor 68 to apply thrust to gimbal as required to match the pitching and rolling of the ride vehicle 14 or car throughout the compound curve. The trailing arms may push the reaction plates 66 that include the running bearings 62 against the rotor's running surface 64. The trailing arms may be aided by the magnetic force, which may pull the reaction plates 66 against the rotor's running surface 64 and cause the reaction plates 66 and the running bearings 62 to bend accordingly. Thus, the reaction plates 66 and the linear coil rotor 68 may be kept relatively parallel, thereby maintaining the near constant air gap 70.

Figure 6:
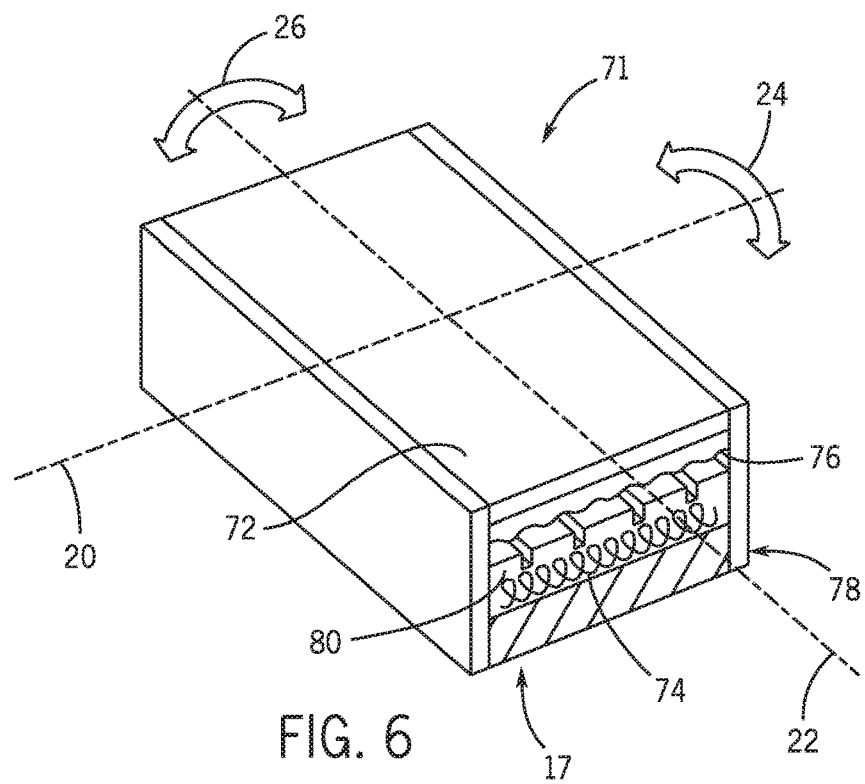
FIG. 6 illustrates hydraulic fluid disposed between reaction plates secured to a ride vehicle and an induction motor in a track to maintain a gap in a compound curve, in accordance with an embodiment.

Further, an embodiment of a system 71 to maintain a near constant gap between a stator, which includes one or more reaction plates 72, and a rotor, which includes one or more linear coils 74, of a LIM throughout a compound curve of a roller coaster track 17 by utilizing hydraulic fluid is illustrated in FIG. 6. For purposes of discussion, a set of axes will be referenced. The axes include a latitudinal axis 20 that extends from the front to the rear of the reaction plate 72 and a longitudinal axis 22 that extends from side to side of the reaction plate 72. The reaction plate 72 depicted may be secured to the bottom of a ride vehicle 14. Indeed, there may be a plurality of segmented reaction plates 72 secured to the bottom of the ride vehicle 14 and they may be articulated. Also, the reaction plate 72 may be aluminum and the same length as the linear coil rotor 74 (e.g., induction motor) that is secured to a track 17 so that the reaction plate 72 may efficiently generate eddy currents to oppose the magnetic field generated by the linear coil rotor 74. In addition, the reaction plates 72 may be sized appropriately to be flexible in order to bend according to the pitch and roll of the compound curve's helix.

In this embodiment, the system 71 may inject hydraulic fluid 76 in between the reaction plates 72 and the linear coil rotor 74 to maintain the gap. The hydraulic fluid 76 may be injected by one or more sprayers installed in the track 17 and/or the ride vehicle 14. The system 71 may include seals 78 that retain the hydraulic fluid 76 after it is sprayed in between the reaction plates 72 and the linear coil rotor 74. Also, the track 17 may include altered surface geometry 80 (e.g., grooves) that promote fluid flow. The hydraulic fluid 76 may include water that may function as a hydrodynamic bearing between the reaction plates 72 and the linear coil rotor 74 to prevent the two from contacting each other. Utilizing the hydraulic fluid 76 may reduce the structural requirements of the ride vehicle 14. As the ride vehicle 14 traverses the helix of the compound curve, the reaction plates 72 may be bent around the latitudinal axis 20, as shown by arrow 24, and around the longitudinal axis 22, as shown by arrow 26, to match the pitch and roll of the ride vehicle 14 while the hydraulic fluid 76 is injected to prevent the reaction plates 72 from clasping to the linear coil rotor 74. Since the hydraulic fluid 76 may be a non-compressible substance, the gap between the reaction plates 72 and the linear coil rotor 74 may be maintained, thereby maintaining the efficiency of the LIM.

Figures 7A, 7B:
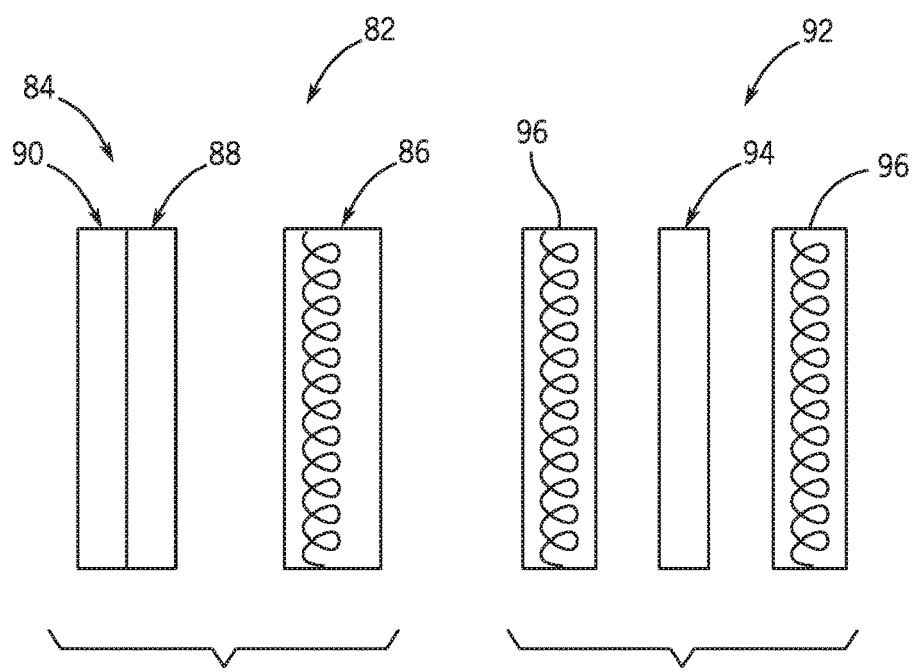
FIG. 7A illustrates a single sided LIM.
FIG. 7B illustrates a double sided LIM, in accordance with an embodiment.

It should be understood that the LIMs discussed above may be either single sided or double sided, as illustrated in FIGS. 7A and 7B, respectively. The single sided LIM 82 illustrated in FIG. 7A includes a stator 84 and a rotor 86. The stator may include a reaction plate with a non-ferrite panel 88 (e.g., aluminum) that faces the rotor 86. The non-ferrite panel 88 may be conductive and it may induce eddy currents when it is passed through a magnetic field generated by the rotor 86. The reaction plate 84 may further include a backing plate 90 that is made of a ferrite material, such as iron. The backing plate 90 may inhibit the eddy currents induced in the non-ferrite material 88 from dissipating and being lost. The rotor 86 may include linear coils (e.g., induction motor) placed in between a ferrite core. The linear coils may be supplied three phase electric power to generate a magnetic field. The double sided LIM 92 depicted in FIG. 7B may include a reaction plate 94 made of a conductive material, such as aluminum, sandwiched between linear coils 96 (e.g., induction motors) on both sides of the reaction plate 94. In both the single sided LIM 82 and the double sided LIM 92, a near constant air gap may be maintained by utilizing the techniques described above.

Figure 8:
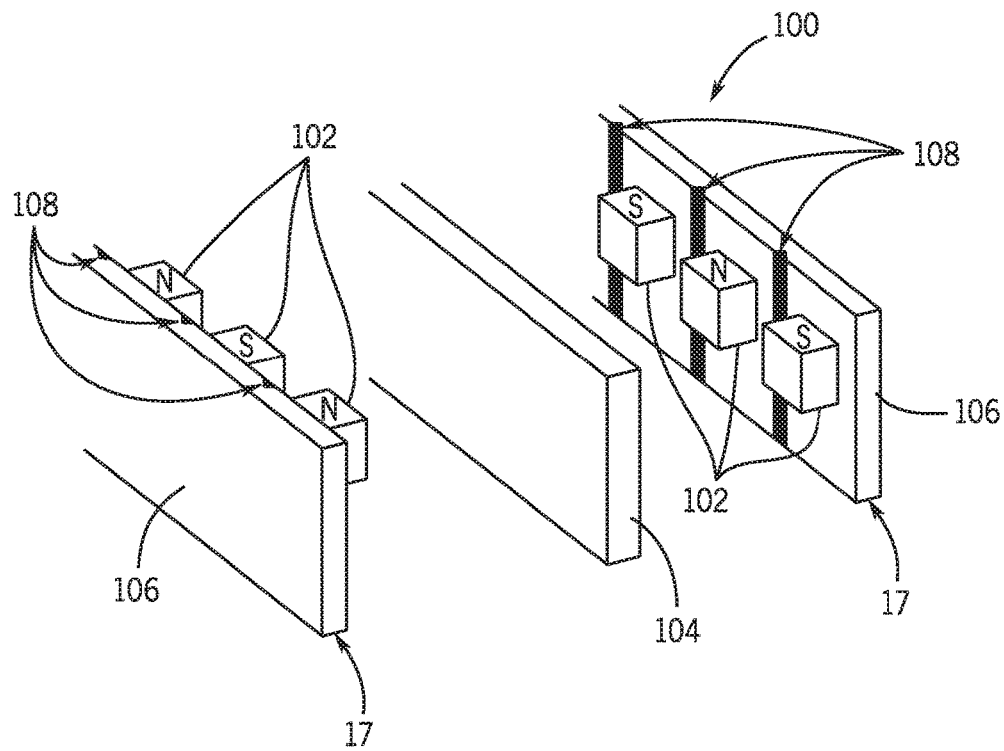
FIG. 8 illustrates a linear synchronous motor (LSM) with permanent magnets installed on rotor panels and a linear coil stator to maintain an air gap through a compound curve, in accordance with an embodiment.

In yet another embodiment, FIG. 8 illustrates a double sided LSM 100 that may utilize permanent magnets 102 installed on rotor panels and a linear coil stator 104 to maintain a near constant air gap through a compound curve of a roller coaster track 17. The permanent magnets may alternate poles (e.g., north and south), as depicted, and the linear coil stator 104 may be secured to a ride vehicle 14. The permanent magnets 102 may be secured to rotor panels 106 of the track 17 on both sides of the stator 104. The rotor panels 106 may resemble an articulated spine in that each portion that contains a permanent magnet 102 may be a vertebrae and the vertebrae may be separated by a flexible substrate (e.g., a scalloped region) 108 that allows the spine to bend around a helix's arc of a compound curve. For example, the flexible substrate may include a cable. The gap between the linear coil stator 104 and the permanent magnets 102 may be maintained as the ride vehicle 14 pitches and rolls through the compound curve by the magnetic attraction and repulsion of the magnets to the magnetic field generated by the linear coil stator 104 on both sides of the stator 104 at the same time.

In this embodiment, the ride vehicle 14 may include circuitry 40 as discussed above for FIG. 3. Specifically, since the linear coil stator 104 is attached to the ride vehicle 14, the ride vehicle 14 may include a power source 50 to supply power to the windings of the coil in order to generate a magnetic field that attracts or repels the magnets 102 secured to the rotor panels, thereby bending or moving the rotor panels 106 via the flexible substrate as desired to maintain the air gap. Further, the memory 48 may store processor-executable code that the processor 44 utilizes to command the power source 50 to provide power at various times throughout the compound curve based on positional data received from sensor 46. In other embodiments, the communication component 42 of the ride vehicle circuitry 40 may receive instructions from an external source, such as the amusement ride's command center, that dictate how to provide power to the linear coil stator 104.

Figure 9:
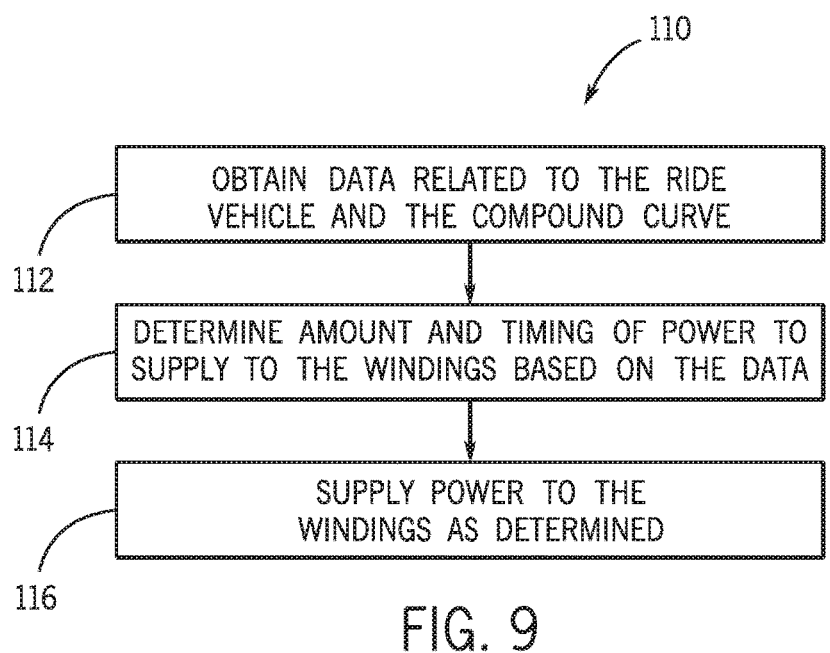
FIG. 9 is a flow diagram of a process suitable for maintaining an air gap in a LSM by supplying power to windings of linear coils, in accordance with an embodiment.

FIG. 9 is a flow diagram of a process 110 suitable for maintaining an air gap in a LSM by supplying power to windings of linear coils, in accordance with an embodiment. The process 110 may include obtaining data related to the ride vehicle 14 and the compound curve (process block 112), determining when to supply power to the windings and how much power to supply based on the data (process block 114), and supplying power to the windings of the linear coils as determined (process block 116). The process 110 may be implemented as processor-executable code stored on one or more non-transitory, computer-readable mediums.

More specifically, process block 112 may include obtaining data related to the ride vehicle 14 and the compound curve by utilizing sensors to detect air gaps between the linear coil stator and the permanent magnets on the rotor panels attached to the track 17. If the air gap is too close to one rotor panel, then it is likely that the air gap is too large to the other rotor panel. The sensors may send the air gap data to the processor that may determine how much power to supply to correct the gap differences and when to supply the power (process block 114). The processor may then command the power source to supply the power as determined, and the power source may perform accordingly (process block 116). As a result, the permanent magnets may be attracted or repelled to the magnetic field of the linear coil windings to bend or move the rotor panels via the flexible substrate and the air gap may be changed. In this way, the gap between the linear coil stator and the permanent magnets attached to the rotor panels may be maintained on both sides of the LSM.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method, comprising:
   obtaining data related to an amusement ride vehicle disposed on a track and a compound curve portion of the track via one or more sensors;
   determining, via a processor, a selected reaction plate of a plurality of reaction plates to actuate based on the obtained data using a closed-loop system to maintain an air gap between the plurality of reaction plates and a linear induction motor (LIM) installed in the track; and actuating actuators coupling the selected reaction plate to a side of the amusement ride vehicle, as determined throughout traversal of the compound curve portion of the track by the amusement ride vehicle, to bend the selected reaction plate to maintain the air gap below an air gap threshold distance throughout the traversal of the compound curved portion.

2. The method of claim 1, wherein the one or more sensors comprise proximity sensors coupled to the amusement ride vehicle, wherein the proximity sensors are configured to obtain data related to the air gap between the plurality of reaction plates and the LIM.

3. The method of claim 1, wherein the LIM comprises linear coil windings installed in a ferrite core.

4. The method of claim 1, comprising utilizing the one or more sensors to send feedback to the processor, the feedback including changes in the air gap after the actuators actuate at a segment of the compound curve portion, so the processor can account for the changes in subsequent actuations at the segment of the compound curve portion.

5. The method of claim 1, wherein the selected reaction plate comprises a flexible material, and wherein actuating the actuators to bend the selected reaction plate comprises actuating the actuators to bend the flexible material of the selected reaction plate.

6. The method of claim 1, wherein the side of the amusement ride vehicle comprises a bottom of the amusement ride vehicle.

7. The method of claim 1, wherein the selected reaction plate includes a bottom side made of aluminum that faces the LIM and a top backing plate made of iron.

8. The method of claim 1, comprising determining, based on the data obtained from the one or more sensors, an amount of power to supply to the LIM throughout the traversal of the compound curve portion of the track by the amusement ride vehicle.

9. A method, comprising:
obtaining data related to positioning of an amusement ride vehicle relative to a compound curve portion of a track via one or more sensors;
determining, via a processor, a selected reaction plate of a plurality of reaction plates to actuate based on the obtained data using a closed-loop system to maintain an air gap between the plurality of reaction plates and a linear induction motor (LIM) installed in the compound curve portion of the track; and
actuating actuators coupling the selected reaction plate to a side of the amusement ride vehicle, as determined throughout traversal of the compound curve portion of the track by the amusement ride vehicle, to bend the selected reaction plate along a longitudinal axis of the selected reaction plate, a latitudinal axis of the selected reaction plate, or both to maintain the air gap below an air gap threshold distance throughout the traversal of the compound curved portion.

10. The method of claim 9, wherein the one or more sensors comprise proximity sensors coupled to the amusement ride vehicle, wherein the proximity sensors are configured to obtain data related to the air gap between the plurality of reaction plates and the LIM.

11. The method of claim 9, wherein the LIM comprises linear coil windings installed in a ferrite core.

12. The method of claim 9, comprising utilizing the one or more sensors to send feedback to the processor, the feedback including changes in the air gap after the actuators actuate at a segment of the compound curve portion so the processor can account for the changes in subsequent actuations at the segment of the compound curve portion.

13. The method of claim 9, wherein the side of the amusement ride vehicle comprises a bottom of the amusement ride vehicle.

14. The method of claim 9, comprising determining, based on the data obtained from the one or more sensors, an amount of power to supply to the LIM throughout the traversal of the compound curve portion of the track by the amusement ride vehicle.

15. A method, comprising:
obtaining data related to an amusement ride vehicle disposed on a track and a compound curve portion of the track via one or more sensors;
determining, via a processor, a selected reaction plate of a plurality of reaction plates to actuate based on the obtained data using a closed-loop system to maintain an air gap between the plurality of reaction plates and a linear induction motor (LIM) installed in the track, wherein the selected reaction plate comprises a flexible material; and
actuating actuators coupling the selected reaction plate to a side of the amusement ride vehicle, as determined throughout traversal of the compound curve portion of the track by the amusement ride vehicle, to bend the flexible material of the selected reaction plate to maintain the air gap below an air gap threshold distance throughout the traversal of the compound curved portion.

16. The method of claim 15, wherein the one or more sensors comprise proximity sensors coupled to the amusement ride vehicle, wherein the proximity sensors are configured to obtain data related to the air gap between the plurality of reaction plates and the LIM.

17. The method of claim 15, wherein the LIM comprises linear coil windings installed in a ferrite core.

18. The method of claim 15, comprising utilizing the one or more sensors to send feedback to the processor, the feedback including changes in the air gap after the actuators actuate at a segment of the compound curve portion so the processor can account for the changes in subsequent actuations at the segment of the compound curve portion.

19. The method of claim 15, wherein the side of the amusement ride vehicle comprises a bottom of the amusement ride vehicle.

* * * * *